United States Patent Office 3,713,841
Patented Jan. 30, 1973

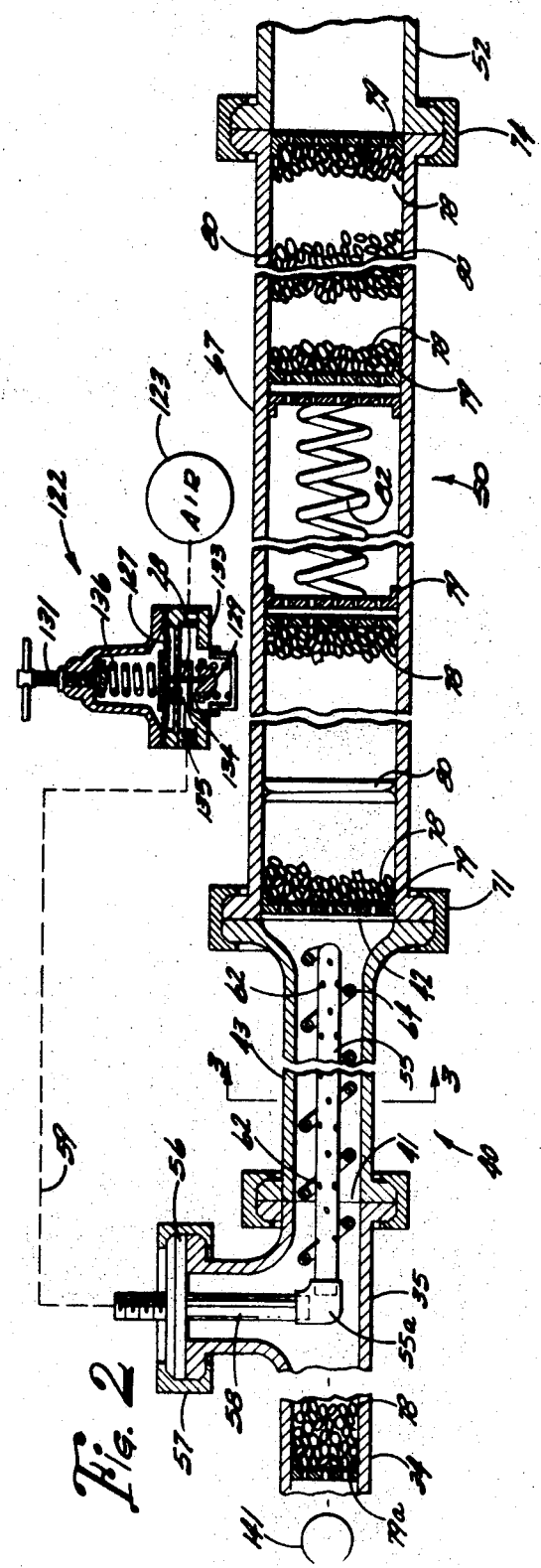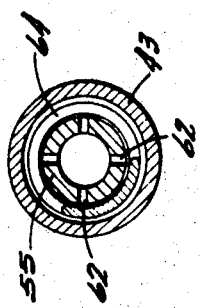

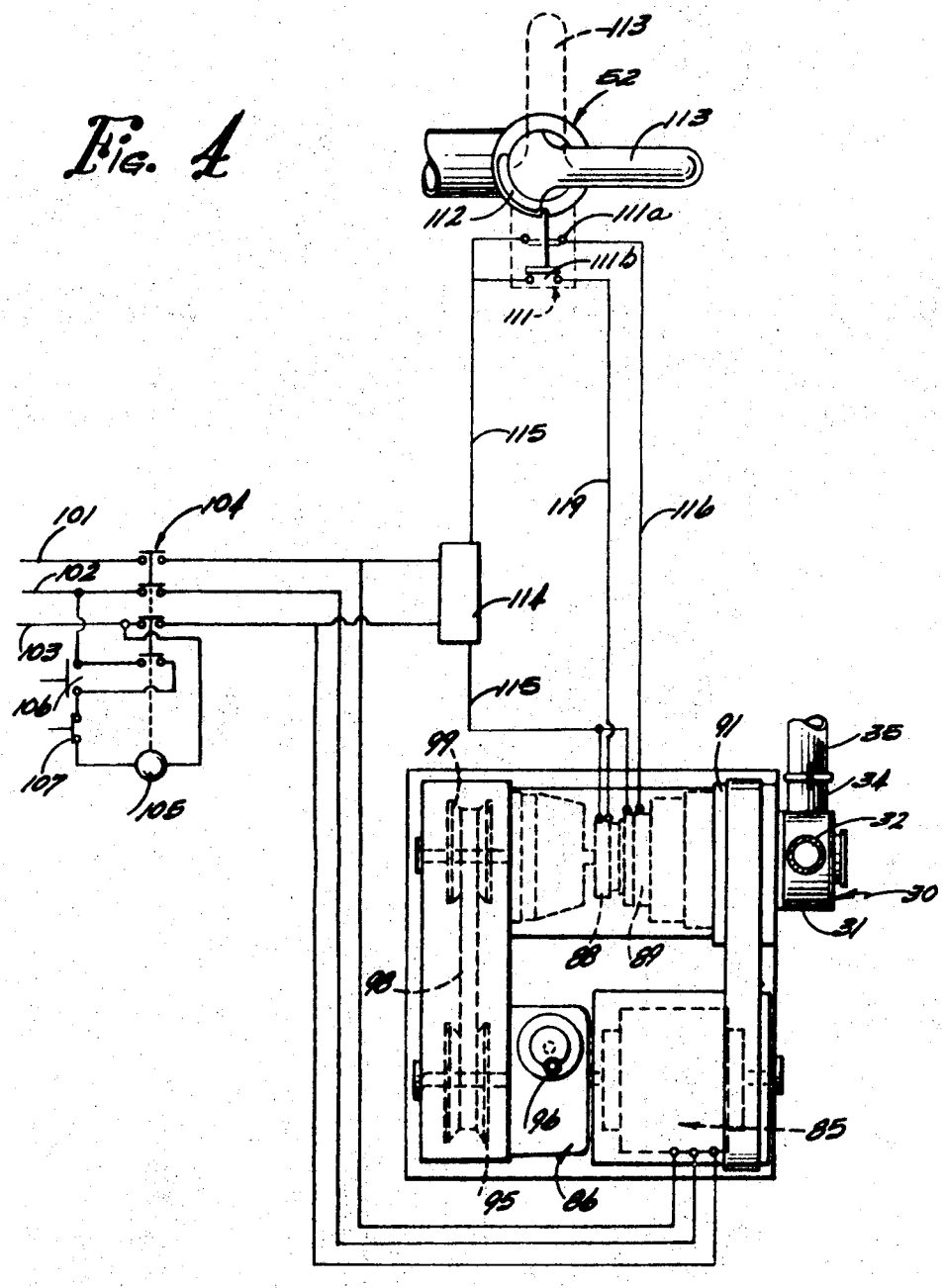

3,713,841
WHIPPING APPARATUS AND METHOD
John MacManus, 143—16 22nd Road,
Whitestone, N.Y. 11357
Continuation of application Ser. No. 571,885, Aug. 11, 1966. This application June 27, 1969, Ser. No. 837,087
Int. Cl. B01f *15/02, 13/02, 5/04*
U.S. Cl. 99—60    12 Claims

ABSTRACT OF THE DISCLOSURE

A static whipping apparatus, preferably for whipping animal or vegetable fat cream, including a large refrigerated storage vessel, a pump for pumping therefrom to a gas injection chember where gas is injected in a plurality of streams, and then to a static whipping tube having irregular impediments of synthetic resin therein.

CROSS-REFERENCE

This application is a continuation of my copending application Ser. No. 571,885, filed Aug. 11, 1966 now abandoned.

BACKGROUND

The invention pertains generally to whipping devices and more particularly to a method and apparatus for feeding a whippable product, whipping or emulsifying the same, and discharging the whipped product.

An important use of whipping apparatus is to produce whipped food products such as whipped cream, imitation whipped cream and toppings for application to food products such as cakes, pies and the like at commercial bakeries wherein the topping must remain stiff and stable for relatively long periods of time and under adverse conditions. In such uses, maximum expansion of the whippable product is frequently desired and high production rate is a significant factor. The process of whipping includes dispensing and incorporating small bubbles of gas into a whippable material to cause expansion of the material, which exapnsion is commonly referred to as overrun. Thus, if the whipped product occupies twice the space of the original material, it is said to have one hundred percent overrun. The stability of the whipped product, particularly under high overrun, is in a large measure dependent upon the size of the gas bubbles and the uniformity in size and distribution. A suitable apparatus is disclosed in my Pat. No. 3,209,554; however, it has been found that even larger flow rates are desirable in many commercial uses.

SUMMARY

The present invention relates generally to a method and apparatus for whipping or emulsifying products and more particularly to a static-type whipping apparatus and a method of whipping food materials such as animal or vegetable fat cream and the like.

An important object of this invention is the provision of a whipping apparatus and method capable of producing whipped products of substantially uniform consistency at a delivery rate greater than has heretofore been possible.

A further object is to provide a whipping apparatus in which food material is stored and dispensed under sanitary conditions.

Another object of the invention is the provision of a whipping apparatus of improved construction capable of producing very stable whipped products at high delivery rates.

Still another object of the present invention is to provide a whipping apparatus having new and useful means for injecting gas under pressure into a whippable material.

Yet another object of the invention is to provide a whipping apparatus having an improved whipping tube arrangement and useful in the production of great overrun of stable products at high delivery rates.

A further object of the present invention, related to the foregoing object, is the provision of a whipping tube arrangement of the type described which contains new and useful impediments which aid in the production of an improved whipped product, which are economical in manufacture, and which are disposable after use.

A still further object of the present invention is to provide a new and useful whipping apparatus which is capable of start and stop operation without a substantial flood of liquid product when a restart is made.

These and other objects and advantages of the present invention will become apparent as the same becomes better understood from the following detailed description when taken in conjunction with the accompanying drawings.

DRAWING

FIG. 2 is a longitudinal sectional view through the injection chamber and whipping tube;

FIG. 3 is a sectional view taken along line 3—3 of FIG. 2;

FIG. 4 is a diagrammatic view illustrating the drive and controls for the feed pump; and FIG. 5 is an elevation view illustrating the impediments surrounded by a net.

DESCRIPTION

Figure 1:
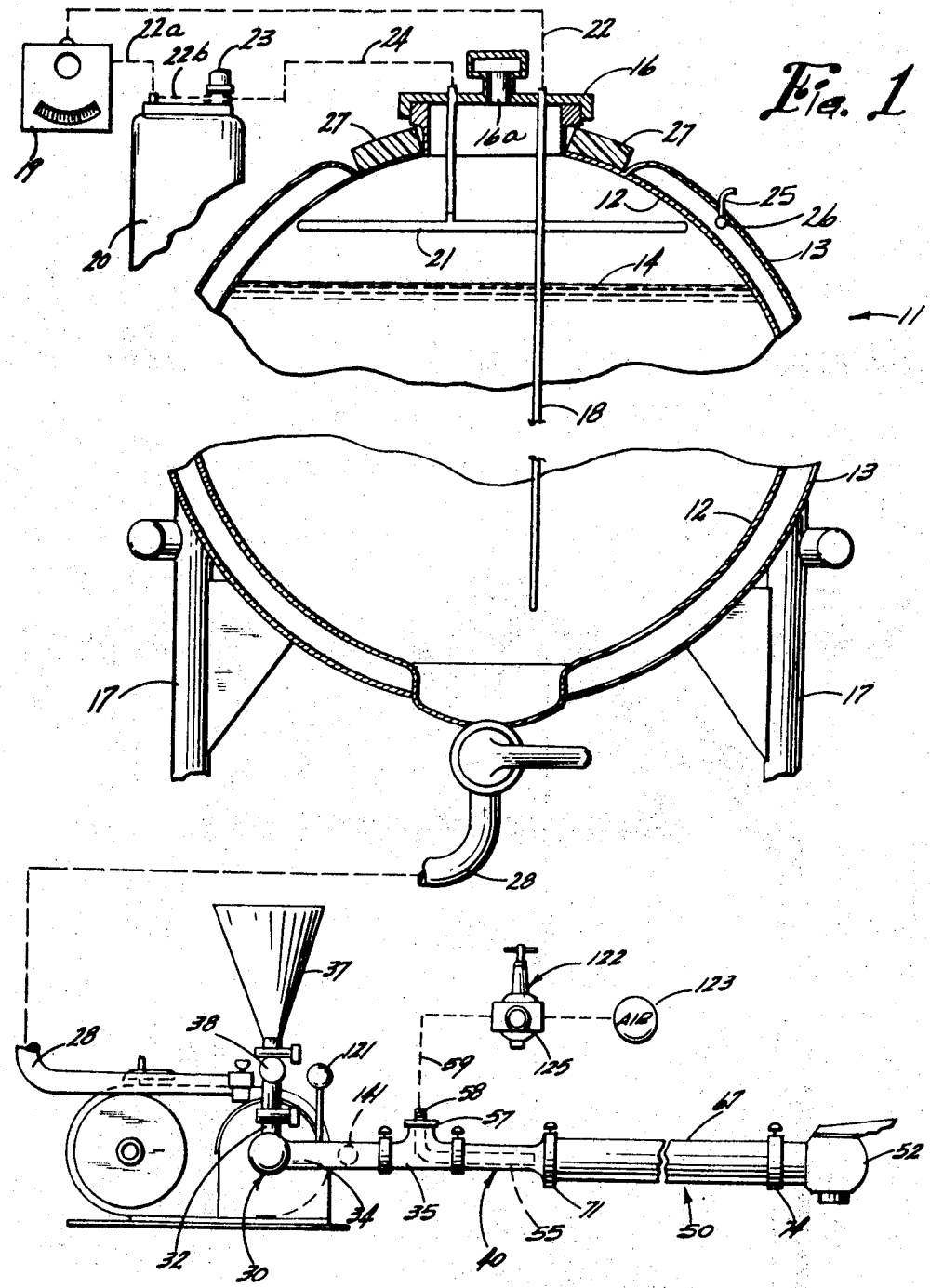
FIG. 1 is an elevational view, with some parts schematic and some in section, illustrating a preferred embodiment of the present invention.

Reference is now made more particularly to the drawings which illustrate the best presently known mode of carrying out the invention and wherein similar reference characters indicate the same parts throughout the several views.

The illustrated embodiment of the invention includes a refrigerated storage vessel or vat indicated generally by the numeral 11 including an inner wall 12 and an outer wall 13. The vat is advantageously in the form of a sphere and adapted for holding a large quantity of whippable food material 14, for example, as much as one thousand to five thousand pounds. The whippable food material may be animal or vegetable fat cream. The whippable material may be placed in the vat in any convenient manner as through opening 16a in cover 16. In this manner, the vat is vented to atmosphere so that the whippable material is held in non-pressurized condition. The vat may be supported in any convenient manner as by a plurality of legs 17.

The whippable food material is advatageously refrigerated and, for this purpose, a refrigeration system is provided for automatically controlling the temperature of the material 14. While it is contemplated that other refrigeration systems may be utilized, the embodiment illustrated includes a temperature probe 18, a temperature controller 19, a liquid nitrogen container 20, and a spray header 21. The probe or sensing element 18 is operatively connected to controller 19 by line 22. When the temperature rises above the controller set point, this information is transmitted to the controller 19 which signals an auomatic valve 23 through lines 22a, 22b. Valve 23 releases liquid nitrogen from the container 20 to spray header 21 as through conduit 24. The spray header 21 is mounted above the level of material 14 and a spray of liquid is pressurized out of the header 21 and vaporizes instantly. The vapor expands, absorbs excess heat, and when the desired temperature is reached, the valve 23 is closed. It is contemplated that a depending tube (not shown) may be inserted in the vat 11 and extend to a point adjacent the bottom to receive the liquid nitrogen and refrigerate the material 14 generally at the center thereof.

Refrigerated storage vessel 11 is advantageously vacuum insulated. Inner wall 12 and outer wall 13 are spaced from each other and arranged to provide a sealed compartment therebetween. A tubular outlet 25, provided with a check valve 26, communicates with the sealed compartment. Air in the sealed compartment is pumped out and outlet 25 weld sealed to secure the vacuum. An insulative collar 27 of styrofoam, for example, may be added for additional insulation.

The whippable food material 14 is preferably withdrawn from the vat 11 and through a conduit 28 by means of a pump 30. Conduit 28 has a valve 29 disposed therein advantageously closely adjacent the vat. The pump is preferably a positive displacement type pump as, for example, a vane or gear pump. As best shown in FIG. 4, the pump includes a casing 31 having an inlet 32 connected to conduit 28 and an outlet 34. Conduit 28 advantageously includes a T portion adjacent inlet 32 to which is connected a supply hopper or reservoir 37 for holding a desired additive for the whippable material 14. A valve 38 is provided to control flow of the additive which preferably is a small ratio to the flow of whippable material. Typical additives are flavorings, sweeteners, fruit juices, and fruit puree.

The apparatus includes a gas injection chamber, generally designated 40 and best shown in FIG. 2, having an inlet 41 communicating with pump outlet 34 through a T connection 35 and an outlet 42 communicating with a static whipping tube, generally designated 50. A valved dispensing nozzle or outlet 52 is connected to the outlet end of whipping tube 50. The injection chamber 40 includes a body portion 43 of generally tubular configuration. The body portion may be formed of several portions but is illustrated as a unitary tube having a bell-shaped end for connection to the larger whipping tube 50. The injection chamber 40 may also utilize a portion of T connection 35, if desired. A tubular core or insert 55 is inserted into the body portion advantageously coaxial therewith and extending substantially the full length thereof. Tubular core 55 is conveniently provided with an elbow 55a and an extension 58 having a flange 56 for providing a closure for the end of T connection 35. Flange 56 is held in position by clamp 57. The extension 58 has a threaded end portion for connection to a supply line of gas under pressure 59. The tubular insert has a plurality of openings 62 arranged in staggered relationship both radially and longitudinally of tubular insert 55 as, for example, at one-quarter inch intervals. As the whippable material is pumped to the expansion chamber 40 through opening 41, and the compressible fluid is fed to the expansion chamber through openings, 62, the material and the gas become mixed in a frothy mixture. By feeding the gas through a plurality of openings, there is better distribution of the gas than has heretofore been possible. While the size of the openings is not important, it has been found that the best distribution is achieved with the smaller openings. By the central location of the tubular insert 55, the whippable material is forced around the insert and the gas is injected laterally of the flow of the material. The whippable material picks up the gas as it moves and is battered against a static spiral wrap 64 which turbulates the flow of the frothy material and provides even greater distribution of the gas. The frothy mixture then passes through outlet opening 42 to whipping tube 50.

The static whipping tube 50 preferably comprises a unitary section 67 connected to injection chamber 40 by a suitable coupling 71. A similar coupling 74 connects section 67 to dispensing nozzle 52. While the specific form of the couplings is not critical, they should be constructed so as to be readily disconnected for cleaning purposes. The whipping tube 50 should be a smooth walled tube preferably of uniform internal diameter, or at least free of abrupt changes in shape or size so that the tube may be readily cleaned. As illustrated in FIGS. 1 and 2, the whipping tube may be disposed horizontally, if desired. Disposed within the tube 50 are a plurality of impediments indicated generally by the number 78, which may substantially fill the tube from end to end, if desired. The impediments are preferably of synthetic resin of a type compatible with the gas and the whippable material. The impediments preferably have a generally smooth non-porous outer surface and an irregular shape. They may, for example, be generally egg-shaped or be generally cylindrical with ends which may be slightly concave or convex. It has been found that irregular impediments having an effective diameter of three to twelve millimeters are advantageously utilized in the present invention. It is important that the irregular impediments be economically made so that they may be discarded after a period of use to eliminate the necessity of cleaning the impediments. By using irregularly shaped impediments, I find that they will pack tightly together in an irregular pattern in intimate contact with the tube and with each other to provide a multiplicity of intersticts therebetween crosswise and lengthwise of the whipping tube to intermix the material and gas in a static whipping operation. With the irregular shape, the interstices are irregular in pattern and prevent any channeling of flow therethrough. Under some conditions there appears to be a minor amount of channeling along the wall of tube 67. To prevent this, an annular member 80 may be inserted in the tube at one or more spaced points. The annular member fits closely adjacent the wall and yet is readily removed for cleaning. The annular member has a generally V-shaped cross-section for deflecting the flow from along the wall toward the impediments at the center of the whipping tube.

In one embodiment of the irregular impediments, there has been utilized a high density polyethylene having a specific gravity in the range of .941 to .965 which approximates or is slightly less than the specific gravity of a whipping cream. It is theorized that the relationship of the material of the impediments to the whippable material is such that the impediments tend to be suspended in the material and pack in the direction of flow, thereby giving a generally uniform distribution of the irregular impediments in a horizontal whipping tube. The impediments are retained in the tube sections by means of screens 79 conveniently formed of an imperforate material and having a frictional fit in section 67. The screen openings are at least smaller than the impediment size so that the impediments will not pass therethrough and may be provided with upstanding cross ribs (not shown) to prevent the impediments from seating across the openings.

As illustrated in FIG. 5, the impediments 78 may be placed in a sleeve 83 for ease in insertion into the tube 67 and removal therefrom for discarding after use. The sleeve is preferably a fine net made of woven nylon threads 83a, like a woman's stocking. After the nlyon net sleeve is filled with the impediments 78, the sleeve is closed as by fastener 84. By using a net, the sleeve is easily elongated for insertion into tube 67 and will expand radially under compression, as exerted by screens 79 and flow of the frothy mixture. Such radial expansion causes the impediments to lie in intimate contact with the wall of tube 67.

With certain materials under certain conditions, a more uniform texture of whipped product may be obtained by introducing into the static whipping tube 50 at spaced points one or more deflector elements (not shown) such as described in detail in my Pat. No. 3,209,554. Another type of static deflector of considerable utility is in the form of a static spiral 82 advantageously disposed in tube 67 and which may be held in place by screens 79 similar to those described above. The static spiral may be made of nylon, for example, and serves to deflect and turbulate the flow of the material and gas as it passes through the central portion of tube 67.

By use of the above described apparatus, greater interspersion within the whipped mass is obtained, and a better homogeneity and stability is accomplished. These improved results are obtained by utilizing static whipping means throughout. Additionally, use of static whipping means eliminates any moving parts, thereby greatly reducing the need of having skilled mechanics. This provides great savings. Also, the entire static whipping means can be easily cleaned and results in further labor saving.

The whipping apparatus may be continuously or intermittently operated to dispense a quantity of whipped product. When intermittently operated, the pump 10 must then be shut off and the valved dispensing nozzle 52 closed to cease such an operation. Further, pump 10 is preferably operable at different speeds to provide the desired volumetric rates and pressures for different operations. For this purpose, the pump is driven from a motor 85 through a variable speed drive 86, a clutch and brake assembly 88, 89, and a speed reducer assembly 91. The variable speed drive 86 may be of any suitable type and is herein shown as comprising an adjustable V-pulley 95 which is adjustable as by a handle 96 to vary its effective diameter. The pulley 95 is connected through a belt 98 to a second adjustable pulley 99, which last-mentioned pulley may be of the spring loaded type to automatically adjust its effective diameter in response to the change in belt pressure produced by varying the diameter of pulley 95. The motor 85 is energized from a power source (not shown) through conductors 101–103 and relay 104. The relay conveniently includes an electro-responsive operator such as solenoid 105 and is under the control of a normally open start switch 106 and a normally closed stop switch 107. The clutch may be of any suitable type and is preferably electrically actuated as diagrammatically indicated in FIG. 4 to selectively establish a driving connection from the motor to the pump drive shaft (not shown). The brake 89 is also preferably electrically actuated as diagrammatically shown in FIG. 4 and operates when energized to retard rotation of the pump drive shaft.

Provision is made for interrelating the operation of the valved dispensing nozzle 52 and the pump 30 so as to drive the pump when the nozzle is open and to stop the pump when the nozzle is closed. As is also diagrammatically shown in FIG. 4, a switch mechanism 111 is provided at the nozzle and is arranged for operation by an actuator 112 conveniently in the form of a cam connected to the valve operating handle 113. As shown, the switch includes a two-position switch mechanism having a first normally closed switch 111a operable when the valve is in its closed position, as shown in solid lines in FIG. 4, to establish a circuit from a transformer 114 through conductor 115, switch 111a and conductor 116 to the electrically operated brake 89 to actuate the brake and stop the pump. When the valve is opened, the switch 111a is moved to its open position to deenergize the brake, and a second normally open switch 111b is closed to energize the clutch circuit through conductor 119 and thereby actuate the clutch 88 to drivingly connect the pump to the motor. The pump is then operated at a speed determined by the setting of the adjustable speed mechanism through handle 96.

As indicated above, the speed of pump 30 will deliver the whippable material to injection chamber 40 at a pressure which varies somewhat in accordance with the speed of the pump. A gauge 121 is advantageously provided in outlet conduit 34 (FIG. 1) to indicate the delivery pressure on the whippable material. In the preferred usage of the whipping apparatus, the pressure of the gas to be injected at the expansion chamber 40 must be at least equal to the delivery pressure of the pump. For this purpose, a regulator 122 is interposed in line 59 leading to a supply of compressible fluid as, for example, an air supply diagrammatically illustrated at 123. The regulator is adjusted to a pressure at least equal to the delivery pressure at gauge 121, and a guage 125 is provided on the regulator to indicate the regulated pressure of gas being supplied to tubular insert 55. As is conventional, the pressure regulator 122 includes a casing 133 defining a control port 134 and has a valve member 129 movable relative to the port to regulate flow therethrough. The valve member is operatively connected as through a stem 128 to a pressure responsive diaphragm 127, which diaphragm is exposed through an orifice 135 to the pressure at the outlet side of the port 134. The valve member is yieldably urged toward an open position by a spring 136 and, when the pressure at the underside of the diaphragm builds up sufficiently, the diaphragm moves the valve member 129 toward its closed position to either shut off flow through the orifice 134 or to throttle the flow sufficient to prevent the pressure at the outlet side of the orifice from building up above the preset pressure. The regulator is adjustable as by an adjusting screw 131 which engages and adjusts the pressure exerted by spring 136 on the valve to thereby enable adjustment of the regulated pressure maintained at the outlet side of the regulator.

The regulator 122 includes means for automatically blocking return flow of fluid from the tubular insert to prevent material from backing into the gas supply line 59 when the apparatus is turned off. This means may be built into the regulator itself or may comprise a separate check valve. In the form illustrated, the regulator diaphragm 127 is rigidly connected through stem 128 to valve 129 so as to positively draw the valve 129 to its closed position when the pressure at the outlet side of the regulator rises above the preset pressure, to thereby prevent opening of the valve when the pressure at the outlet side builds up above the preset pressure. Alternatively, a check valve may be provided at the outlet of the regulator to prevent such return flow.

To likewise prevent the material from backing up through outlet conduit 34, a check valve 141 is provided therein. By means of check valve 141 and the check valve in the line 59, the whippable material and gas combination is maintained in its relative position throughout the injection chamber 40 and whipping tube 50 when nozzle 52 is shut off. With no movement of the material and gas mixture, it will substantially retain its statically whipped characteristics during periods when the valve is shut off. In this manner, there is substantially no liquid surge at the time of a subsequent restart.

By way of example, one structure capable of producing the results of the invention includes a whipping tube having a substantially uniform internal diameter of about one and three-eighths inches and approximately fifteen inches in length. By utilizing the large storage vessel 11 and pumping apparatus 30 in combination with the improved injection chamber 40 and the whipping tube 50 having improved impediments 78, the whipping apparatus is capable of whipping twice the amount of an average whippable product as that of the apparatus disclosed in my Pat. No. 3,209,554. The new arrangement of injection chamber 40 initially gives better distribution of air or gas because of the multiple openings 62. There is also provided a plurality of impediments 78 in outlet tube 34 between check valve 141 and injection chamber 40. These may be held in place by screens 79a similar to screens 79 described above. These impediments 78 in tube 34 serve to turbulate the flow into the injection chamber and aid in gas distribution. The impediments in the whipping tube 50, being irregular, create a plurality of irregular interstices thereby greatly breaking up and dispersing the air bubbles. The result is a more stable whipped product having a higher overrun.

The embodiments of the invention in which an exclusive property or privilege is claimed are defined as follows:

1. A static-type whipping apparatus for whipping food materials such as animal or vegetable fat cream and comprising: storage means for holding a whippable food material at atmospheric pressure, a dispensing nozzle, a whipping tube having one end connected to the dispensing nozzle, a gas injection chamber having an inlet port and an outlet port connected to the other end of the whipping tube, pumping means for pumping the whippable material from the storage means to the inlet port of the gas injection chamber under pressure, means for supplying a gas under pressure to the gas injection chamber in a plurality of streams intermediate the inlet and outlet ports to produce a frothy mixture of the gas and whippable material in said gas injection chamber for passage to the whipping tube, and static whipping means in at least a portion of the whipping tube disposed in intimate contact with the tube for providing a multiplicity of interstices for the passage of and intermixing of the material and gas to produce a whipped product.

2. A static-type whipping apparatus as set forth in claim 1 wherein the means for supplying gas under pressure comprises an insert disposed generally at the core of the gas injection chamber intermediate the inlet and outlet ports, said insert having a hollow interior for receiving the gas under pressure and a plurality of openings communicating the interior with the gas injection chamber, whereby gas is supplied in a plurality of streams emitting from the core of the gas injection chamber.

3. A static-type whipping apparatus as set forth in claim 2 wherein the inlet port is at one end of the gas injection chamber and the outlet port is at the end opposite said one end, the gas injection chamber having a longitudinal axis extending between said ends, said insert means being an elongate tube at said axis and extending the full length of the gas injection chamber, said plurality of openings being spaced circumferentially and longitudinally of the elongate tube, and including means disposed between the elongate tube and the inner surface of the gas injection chamber for changing the flow pattern of the material between the inlet and outlet ports.

4. A static-type whipping apparatus as set forth in claim 3 wherein the pumping means includes a positive-displacement pump and a conduit connected to the pump and inlet port of the gas injection chamber, and including a plurality of impediments means filling a portion of said conduit for providing turbulent flow of the material entering the gas injection chamber.

5. A static-type whipping apparatus for whipping food materials such as animal or vegetable fat cream, and comprising: storage means for holding a whippable food material at atmospheric pressure; a whipping tube having first and second ends; a dispensing nozzle at the second end of the whipping tube; an outlet valve for controlling flow through the dispensing nozzle; a pump having an inlet operatively connected to the storage means and an outlet operatively connected to the fist end of the whipping tube; means for driving the pump to pump the whippable food material from the storage means under pressure to the whipping tube; means for introducing a gas under pressure into the pressurized whippable food material after the pump inlet and before the first end of the whipping tube; static whipping means in the whipping tube for providing a multiplicity of interstices lengthwise and crosswise of the whipping tube for intermixing the gas and whippable food material passing through the whipping tube to produce a whipped food product; said pump adapted for forcing the gas and whippable food material through the static whipping means to the dispensing nozzle when the outlet valve is opened.

6. A static-type whipping apparatus as set forth in claim 5 and including drive means for driving the pump, and means for actuating the drive means to drive the pump in response to opening of said valve, whereby flow of the whippable food material and the whipping in the whipping tube occur only when the outlet valve is opened.

7. A static-type whipping apparatus as set forth in claim 6 including a check valve located between the pump outlet and the first end of the whipping tube to prevent back flow of material when the pump is not being driven.

8. In a whipping apparatus for whipping food materials such as animal or vegetable fat cream and having storage means for holding a whippable food material, a gas injection chamber, means for feeding the whippable material to the gas injection chamber, and means for introducing a quantity of gas into the injection chamber to produce a mixture of gas and whippable food material, the improvement comprising: a whipping tube having one end communicating with the gas injection chamber to receive the mixture therefrom, the whipping tube comprising a tubular conduit having a smooth non-porous inner surface and a uniform diameter throughout a portion of its length, a plurality of synthetic resin impediments compatible with the gas and material, said impediments filling the whipping tube through at least a portion thereof and in intimate contact with the tube and with each other to provide a multiplicity of interstices therebetween crosswise and lengthwise of the whipping tube to intermix the whippable food material and gas, said impediments having an irregular shape and a smooth non-porous outer surface, a tubular net of synthetic resin surrounding the impediments to facilitate insertion and removal thereof, and coupling means removably connecting the whipping tube to the remainder of the whipping apparatus whereby the whipping tube is readily dismantled and the impediments discarded.

9. An apparatus as set forth in claim 8 wherein the impediments have a specific gravity in the range of .941 and .965.

10. An apparatus as set forth in claim 8 including at least one annular insert in the whipping tube intermediate the ends thereof, said annular insert shaped for fitting closely adjacent the inner surface of the whipping tube for deflecting flow of the frothy mixture from the inner surface of the whipping tube toward the center thereof.

11. A method of whipping food materials such as animal or vegetable fat cream including the steps of:
 (a) providing a positive-displacement pump having an inlet and an outlet connected to a static whipping tube having a plurality of non-moving impediments providing interstices lengthwise and crosswise of the static whipping tube;
 (b) valving the outlet of the static whipping tube with a dispensing valve to control flow through the static whipping tube;
 (c) opening the dispensing valve and simultaneously starting the pump to pump the food material under pump pressure to the static whipping tube;
 (d) introducing a gas into the whippable food product prior to entry into the static whipping tube;
 (e) forcing the whippable food product and gas through the interstices to intermix the same and produce a whipped food product; and
 (f) closing the dispensing valve and simultaneously stopping the pump to prevent flow from the static whipping tube and to stop pumping of the whipped food material thereto.

12. A method as set forth in claim 11 including: preventing backflow of the whippable food material and gas from the static whipping tube to the pump when the pump is stopped.

References Cited

UNITED STATES PATENTS

| | | |
|---|---|---|
| 847,552 | 3/1907 | Carlson. |
| 974,774 | 11/1910 | Caul. |
| 1,889,236 | 11/1932 | Burmeister. |
| 1,927,376 | 9/1933 | Schroder et al. |
| 2,304,579 | 12/1942 | Lindsey _____ 62—114 |

(Other references on following page)

UNITED STATES PATENTS

| | | |
|---|---|---|
| 2,536,340 | 1/1951 | Alikonts _____ 107—31 X |
| 2,622,411 | 12/1952 | Ogden _____ 62—114 |
| 2,645,463 | 7/1953 | Stearns _____ 259—4 |
| 2,654,585 | 10/1953 | Heesen. |
| 2,731,253 | 1/1956 | Spencer _____ 261—118 |
| 2,784,948 | 3/1957 | Pahl et al. |
| 2,864,714 | 12/1958 | Dixon Jr., et al. |
| 3,017,165 | 1/1962 | Idzi. |
| 3,041,841 | 7/1962 | Henry. |
| 3,122,594 | 2/1964 | Kielback. |
| 3,148,802 | 9/1964 | Webb. |
| 3,203,371 | 8/1965 | Mosey _____ 261—75 |
| 3,209,554 | 10/1965 | MacManus. |
| 3,212,762 | 10/1965 | Carroll et al. |
| 3,226,100 | 12/1965 | Banziger. |
| 3,235,234 | 2/1966 | Beaudain. |
| 2,847,197 | 8/1958 | Thompson, Jr. _____ 259—109 |
| 3,274,005 | 9/1966 | Alsys. |
| 3,289,423 | 12/1966 | Berner et al. |
| 3,448,038 | 6/1969 | Pall et al. _____ 261—97 X |
| 2,967,700 | 1/1961 | Lee et al. |

FOREIGN PATENTS

| | | |
|---|---|---|
| 335,889 | 9/1930 | Great Britain _____ 261—94 |
| 466,574 | 5/1937 | Great Britain _____ 261—97 X |

DENNIS E. TALBERT, Jr., Primary Examiner

U.S. Cl. X.R.

62—306; 261—64, 94, 95, 96, 124, 140